(12) United States Patent
Ritchey et al.

(10) Patent No.: US 8,898,174 B2
(45) Date of Patent: *Nov. 25, 2014

(54) SYSTEMS, METHODS AND INTERFACES FOR AGGREGATING AND PROVIDING INFORMATION REGARDING LEGAL PROFESSIONALS

(75) Inventors: Kevin L. Ritchey, St. Paul, MN (US); Charles Vanek, Minneapolis, MN (US)

(73) Assignee: West Services, Inc., Eagan, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,894

(22) Filed: Dec. 27, 2011

(65) Prior Publication Data

US 2012/0096012 A1     Apr. 19, 2012

Related U.S. Application Data

(63) Continuation of application No. 11/331,409, filed on Jan. 12, 2006.

(60) Provisional application No. 60/643,445, filed on Jan. 12, 2005, provisional application No. 60/643,446, filed on Jan. 12, 2005.

(51) Int. Cl.
*G06F 17/30* (2006.01)
*G06Q 30/02* (2012.01)
*G06Q 10/10* (2012.01)

(52) U.S. Cl.
CPC ................ *G06Q 30/02* (2013.01); *G06Q 10/10* (2013.01)
USPC .......................................... 707/748; 707/758

(58) Field of Classification Search
USPC .................................................. 707/748, 758
See application file for complete search history.

(56) References Cited

U.S. PATENT DOCUMENTS

| 5,692,181 A | 11/1997 | Anand et al. |
| 6,038,560 A | 3/2000 | Wical |

(Continued)

FOREIGN PATENT DOCUMENTS

| JP | 2002183356 A | 6/2002 |
| WO | WO-0111559 A1 | 2/2001 |
| WO | WO-2006076450 A1 | 7/2006 |

OTHER PUBLICATIONS

"U.S. Appl. No. 11/332,783, Non-Final Office Action mailed Jan. 7, 2008", OARN, 3 pgs.

(Continued)

*Primary Examiner* — Son T Hoang
(74) *Attorney, Agent, or Firm* — Edwards Wildman Palmer LLP; David J. Silvia; Adam P. Daniels (57) ABSTRACT

A method for determining legal experience including determining a count of times each attorney of a plurality of attorneys is identified as an author of at least one document of a plurality of documents, each document of the plurality of documents has a date associated therewith; applying a weight to the count based on the date of each document used to determine the count to yield a weighted count, a more recent date corresponds to a greater weight; determining a legal experience indicator for each attorney based on the weighted count; and ranking each attorney of the plurality of attorneys according to the legal experience indicator; providing a list of the plurality of attorneys according to the ranking.

7 Claims, 8 Drawing Sheets

(56) References Cited

U.S. PATENT DOCUMENTS

| | | |
|---|---|---|
| 6,311,169 B2 | 10/2001 | Duhon |
| 7,216,115 B1 | 5/2007 | Walters et al. |
| 7,395,222 B1* | 7/2008 | Sotos .......................... 705/7.34 |
| 7,523,045 B1 | 4/2009 | Walker et al. |
| 2002/0010614 A1* | 1/2002 | Arrowood ........................ 705/9 |
| 2002/0038233 A1* | 3/2002 | Shubov et al. .................. 705/8 |
| 2002/0133374 A1* | 9/2002 | Agoni et al. ..................... 705/2 |
| 2003/0046277 A1 | 3/2003 | Jackson et al. |
| 2003/0084014 A1 | 5/2003 | Sohrabi et al. |
| 2003/0088556 A1 | 5/2003 | Allen |
| 2003/0158747 A1 | 8/2003 | Beton et al. |
| 2003/0195876 A1 | 10/2003 | Hughes et al. |
| 2004/0015329 A1 | 1/2004 | Shayegan et al. |
| 2004/0249968 A1 | 12/2004 | Srivstava |
| 2005/0149343 A1 | 7/2005 | Rhoads et al. |
| 2005/0165780 A1* | 7/2005 | Omega et al. .................... 707/7 |
| 2005/0177476 A1* | 8/2005 | McCandless et al. .......... 705/32 |
| 2005/0203769 A1* | 9/2005 | Weild ............................... 705/1 |
| 2005/0278633 A1 | 12/2005 | Kemp |
| 2006/0047615 A1* | 3/2006 | Ravin et al. .................... 706/50 |
| 2006/0129593 A1 | 6/2006 | Slovak et al. |

OTHER PUBLICATIONS

"U.S. Appl. No. 11/332,783, Response filed Jul. 7, 2008 to Non Final Office Action mailed Jan. 7, 2008", 12 pgs.

U.S. Appl. No. 11/332,783, Response filed Aug. 3, 2009 to Advisory Action mailed Mar. 3, 2009, 16 pgs.

"International Search Report for corresponding PCT Application No. PCT/US2006/001012", (Jun. 12, 2006), 3 pgs.

martindale.com, "Lawyer Locator Technical Help" (http://web.archive.org/web/20000304122628/www.martindale.com/locator/tech_sup.html), Mar. 2000.

* cited by examiner

SYSTEMS, METHODS AND INTERFACES FOR AGGREGATING AND PROVIDING INFORMATION REGARDING LEGAL PROFESSIONALS

CROSS REFERENCE TO RELATED APPLICATIONS

This Application is a Continuation Application of U.S. patent application Ser. No. 11/331,409 filed on Jan. 12, 2006, which claims the benefit of U.S. Provisional Application No. 60/643,445 and U.S. Provisional Application No. 60/643,446, both filed on Jan. 12, 2005. U.S. patent application Ser. No. 11/331,409 and U.S. Provisional Application Nos. 60/643,445 and 60/643,446 are all incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2004, Thomson Findlaw.

TECHNICAL FIELD

Various embodiments of the present invention concern information retrieval systems, particularly those that are tailored for particular industries, such as the legal industry.

BACKGROUND

A key aspect of the American legal system (as well as many others around the world) is its reliance on professional advocates, or lawyers, to facilitate adjudication or avoidance of legal disputes. Indeed, one of the constitutional rights that we as Americans cherish most dearly is the right to counsel. Thus, when confronted with a legal issue, one of the first questions that prudent businesses and individuals seek to answer is which attorney or law firm will assist them with expert legal advice and advocacy.

In recent years, many facing this question have sought to use the power of the Internet as a tool in identifying and/or selecting effective counsel for their legal needs. For example, many use general search engines, such as www.Google.com or www.Yahoo.com, to broadly search the World Wide Web for lawyers based on location and particular legal expertise. Others rely on legally focused resources, such as www.findlaw.com which provides and maintains an extensive directory of law firms and legal professionals.

Although both generic and specific resources can be effective in identifying relevant lawyers, the present inventor has recognized there is considerable room for improvement. For example, the current resources lack any objective information regarding the experience of lawyers in specific legal specialties.

Accordingly, the present inventor has identified a need for better ways of searching for lawyers.

SUMMARY

To address these and/or other needs, the present inventor devised systems, methods, interfaces, and software that can facilitate identification of law firms and/or legal professionals. One exemplary system receives queries from users regarding a legal topic and responds with a listing of attorneys or law firms that are associated with information ranking them based on their experience in handling matters related to the legal topic. The ranking information is based on links between attorneys and public legal documents, such as judicial opinions, court dockets, briefs, litigation documents, journal articles, patents, trademarks, and so forth that mention them by name.

DETAILED DESCRIPTION OF EXEMPLARY EMBODIMENT(S)

This description, which incorporates the Figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
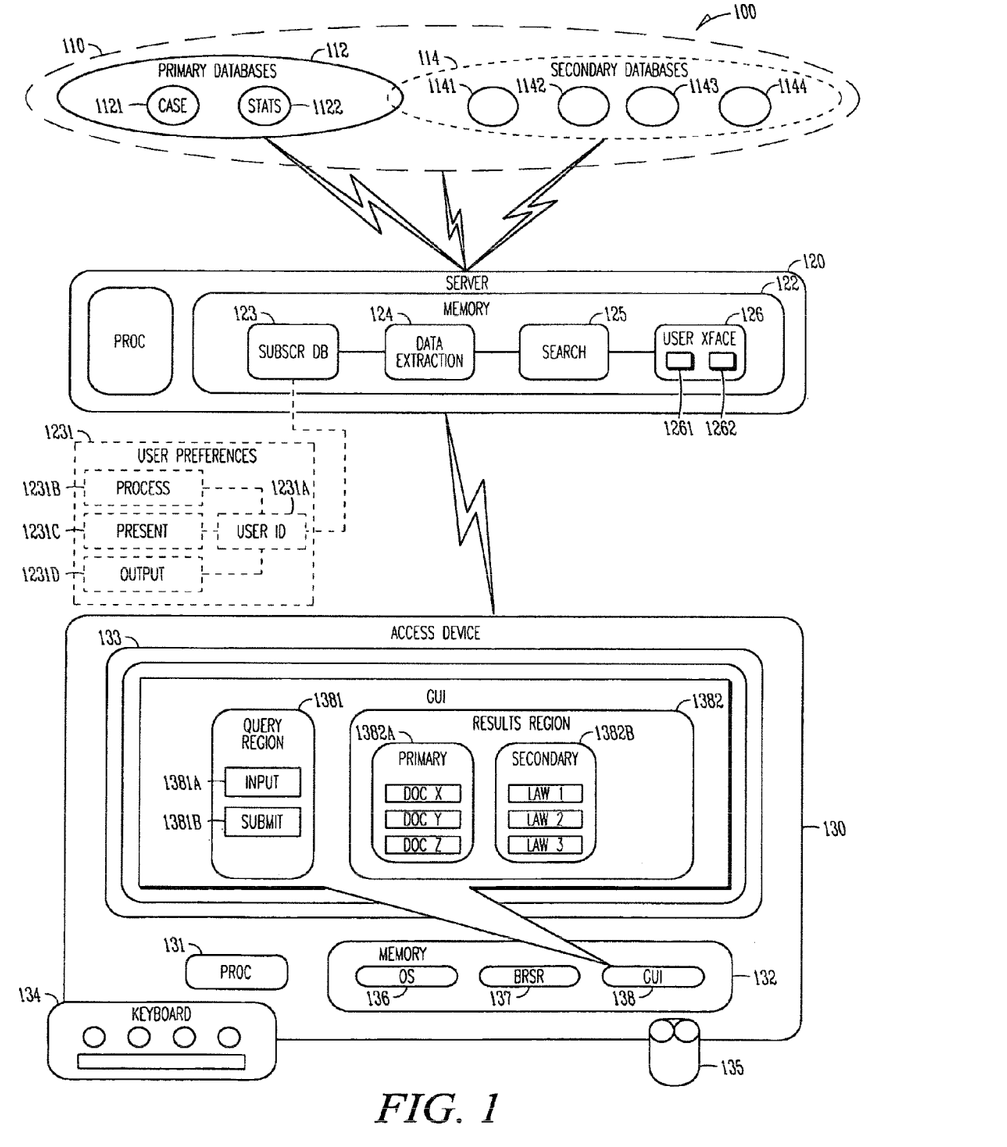
FIG. 1 is a block diagram of an exemplary information-retrieval system corresponding to one or more embodiments of the present invention.

FIG. 1 shows an exemplary online information-retrieval system 100, which incorporates teachings of the present invention. System 100 includes one or more databases 110, one or more servers 120, and one or more access devices 130.

Databases 110 include a set of primary databases 112 and a set of second databases 114. Primary databases 112, in the exemplary embodiment, include a case law database 1121 and a statutes database 1122, which respectively include judicial opinions and statutes from one or more local, state, federal, and/or international jurisdictions. Secondary databases 114 provide attorney, judge, law firm, product, and corporate profiles as well as briefs, pleadings. More specifically, one set of databases includes one or more of the following types of content: federal court dockets, mergers and acquisitions information, jury verdicts and settlements. Another set includes one or more of the following content types: patents, trademarks, copyrights, Security and Exchange Commission (SEC) filings; federal administrative decisions, AOC federal court statistics, NCSC state court statistics, press releases, news reports, website content, state dockets, state attorney general opinions, state administrative decisions, corporate filing and registration; federal and state court briefs, federal and state pleadings and motions, law reviews, bar journals, and continuing legal education (CLE) materials.

Each corporate profile include one or more industry classification codes or indicators as well as associations to lawyer and law firm names derived from matching their names to those in documents containing references to both the corporate entity and the lawyer or law firm. In some embodiments, the case law documents are logically associated via a data structure with documents or profiles in databases 114. Additionally, attorney or law firm profiles are associated with data structures that provide experiential ratings for the attorneys in various legal and/or jurisdictional categories of law.

The tallies may be made by counting the number of times a given attorney's name or a given law firm's name appears in court documents that pertain to a given legal specialty, such as intellectual property law, employment law, or tax. Association of documents with legal specialties or topics is based on a legal categorization system such the Key Search System, which is featured in the Westlaw Online Research System. Other embodiments also tally journal articles identifying a given attorney as an author. In some cases, the tally of cases or articles or other documents can be deemphasized based on the age of the cases or articles, so that more recent experience can be weighted more heavily than past experience in determining an experiential rating. (In some embodiments, alternative or supplemental experiential ratings can be determined in real-time based on user specified criteria taken alone or in conjunction with previously generated experiential data and statistics derived from case law and other types of documents in the databases.) Other embodiments may include non-legal databases that include financial, scientific, or health-care information.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a data-extraction module 124, a search module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary foam of one or more electronic, magnetic, or optical data-storage devices, stores subscriber database 123, data-extraction module 124, search module 125, and user-interface module 126.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1221 includes a customer or user identifier portion 1231A, which is logically associated with one or more report generation or presentation preferences, such as preferences 1231B, 1231C, and 1231D. Preference 1231B includes a default value governing whether one of more of the functions described herein is enabled or disabled. Preference 1231C includes a default value governing presentation of interfaces related to the one or more functions. Preference 1231D includes a default value governing other aspects of the one or more functions. (In the absence of a temporary user override, for example, an override, during a particular query or session, the default value for trend reporting.)

Data-extraction module 124 includes one or more sets of machine-executable instructions for extracting attorney identification data, court and court date information, attorney plaintiff-defendant status information, client identification data, client industry identification data, client plaintiff-defendant status information, attorney-to-client identification data, and law-firm identification data from documents in databases 110.

In some embodiments, data-extraction module 124 produces a secondary index or other form of data structures which logically associates or relates documents and/or specific data contained in those documents to specific lawyers and/or law films. In some embodiments, data-extraction module 124 includes separates sets of parsers and extractors tailored for various types of documents in database 110. Additionally, some embodiments employ simple text matching of lawyer and law firm names in attorney and law firm profiles or in corporate profiles to documents that are classified according to a legal subject matter hierarchy, such as the Key Search system, whereas others employ complex Bayesian matching or other intelligent techniques for inferring such data connections.

The Key Search system provides the following top level of legal categories: Administrative Law, Agriculture, Alternative Dispute Resolution (ADR), Antitrust and Trade Regulation, Art, Entertainment, and Sports Law, Bankruptcy, Business Organizations, Civil Procedure, Civil Remedies, Civil Rights, Commercial Law and Contracts, Communications, Conflict of Laws, Constitutional Law, Construction Law, Criminal Justice, Education, Elections and Politics, Employment Law, Energy and Utilities, Environmental Law, Family Law, Finance and Banking, Government, Health Immigration Law, Indigenous Peoples, Insurance, Intellectual Property, International Law, Juvenile Justice, Legal Services, Maritime Law, Military Law, Products Liability, Professional Malpractice, Property-Personal, Property-Real, Science, Computers, and Technology, Securities Law, Taxation-Federal, Taxation—State and Local, Torts/Personal Injury, Transportation, Veterans, Wills, Trusts, and Estate Planning.

In some embodiments, data extraction module 124 includes web-based applications to semantically connect or link legal practitioners' customers (current or prospective) to detailed information related to the attorney's experience, relevancy (to the legal issue at hand), and context (of the customer). In addition, some embodiments enable attorneys and their customers to automatically generate reporting data to determine attorneys' and/or firms' success records, law-firm trends and history in various legal specialties, and customer (client) trends and histories with attorneys and firms who have represented them. Also, this legal-practitioner data can form "visual relationships" of attorneys with cases, judges, other attorneys, clients, publications, etc. The exemplary technology provides a comprehensive solution to tracking information on legal practitioners in the contexts of legal relevance and contextual relationships, reports, and visual relationships. While some embodiments of the present invention have this capability (for example by suggesting legal subject matter experts or related published materials in response to case law or legal literature queries) others, potentially more significant, provide data based on documented relationships that have been experienced between attorneys, firms, judges, and clients to produce legitimate related references.

Search module 125 includes one or more search engines for receiving and processing user queries against one or more of databases 110. In the exemplary embodiment, one or more search engines associated with search module 124 enable users to search for attorneys or law firms with demonstrated experience in a given legal issue and/or given court/judge. Attorneys and law firms are sorted by relevance, with the most experienced in a given legal issue and/or court displayed first based on experiential ranking information. This module (in cooperation with others) also enables users to find legal representation through contextual relationships on related web pages. For example, if a user is viewing a page with content related to intellectual property, the system recommends attorneys who are local (and potentially national) experts in intellectual property. Some embodiments are sensitive to whether the legal context is a local, state, or federal issue, limiting or even expanding recommendations accordingly. For example, patent law is generally a federal issue, so that attorney or firm locality may often be of lesser significance. Results can be expanded and ordered accordingly.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 13 lone or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the folio of a version of Microsoft Internet Explorer. (However, some embodiments use other operating systems and browsers.) Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120 to implement the interfaces shown above or elsewhere in this description.)

More specifically, GUI 138 includes a query region 1381 and a results region 1382. Query region 1381 includes an input feature 1381A and a submit feature 1381B. Input feature provides one or more input regions, such as a lawyer-law-firm selection feature, a geographic (or jurisdictional) selection feature, and a legal subject matter feature.

In the exemplary embodiment, each of these control features takes the form of a hyperlink or other browser-compatible command input, and provides access to and control of query region 1381 and search-results region 1382. User selection of the control features in region 1382 results in retrieval and display of at least a portion of the corresponding document within a region of interface 138 (not shown in this figure.) Although FIG. 1 shows region 1381 and 1382 as being simultaneously displayed, some embodiments present them at separate times.

Figure 2:
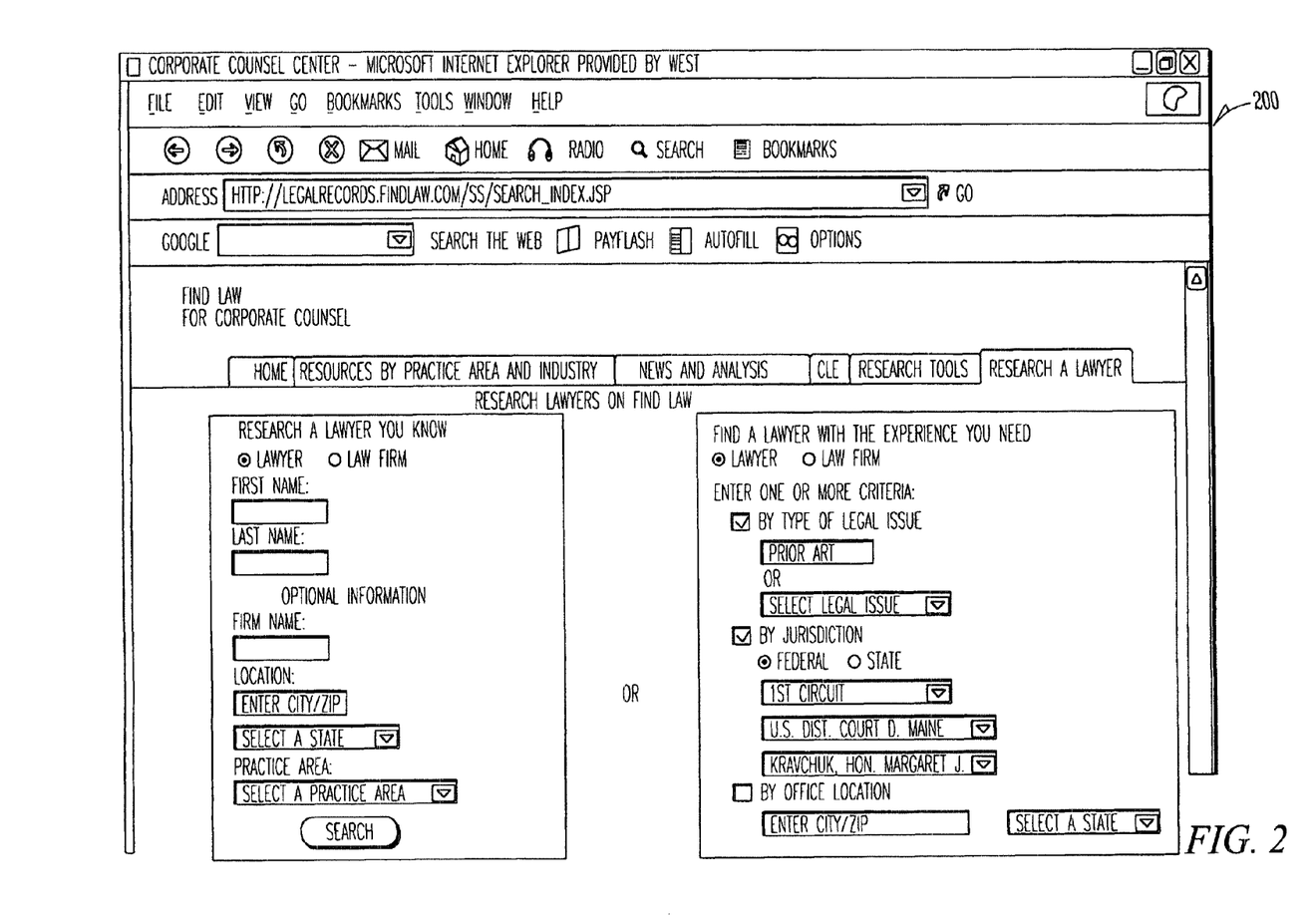
FIG. 2 is a facsimile of an exemplary graphical user interface 200 which corresponds to one or more embodiments of the present invention.
Figure 3:
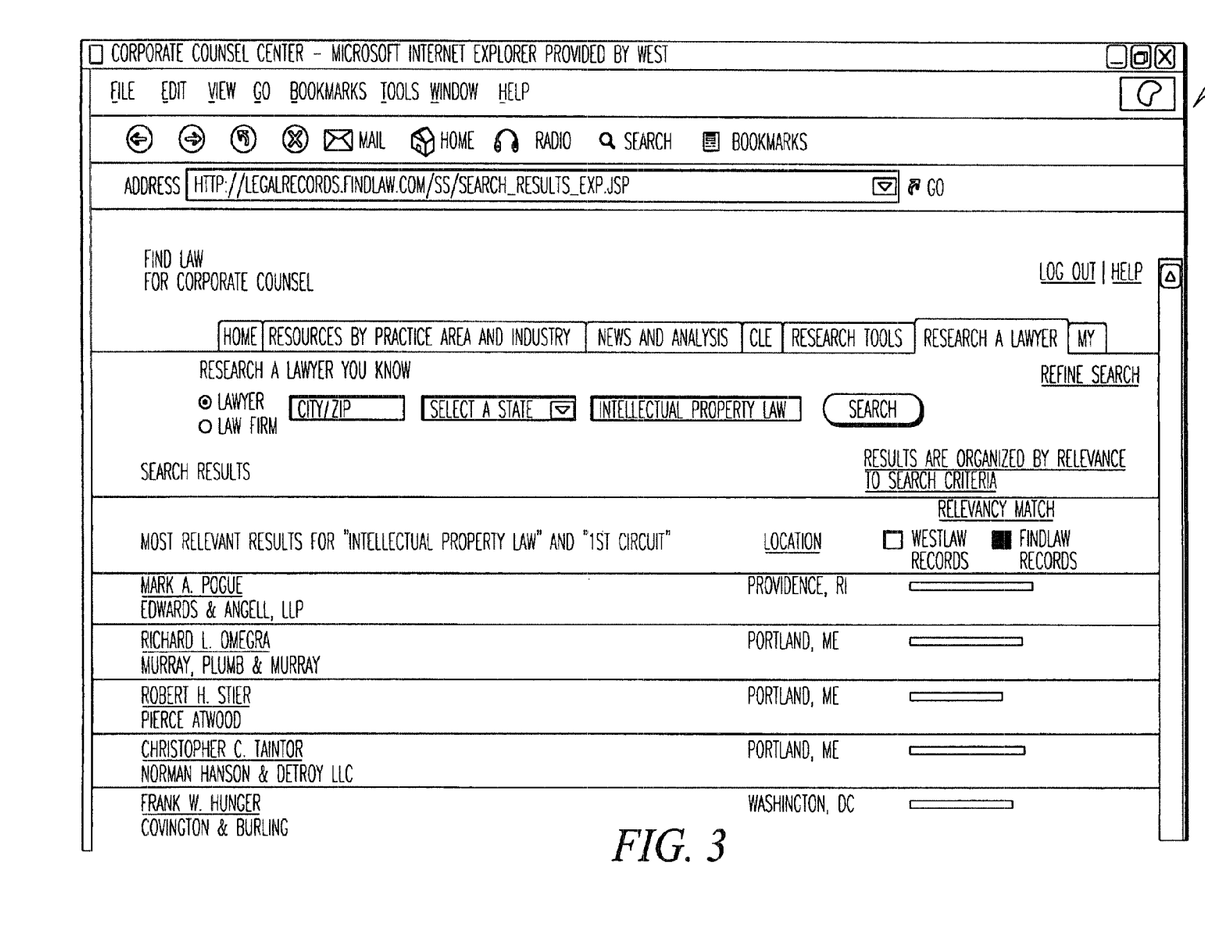
FIG. 3 is a facsimile of an exemplary graphical user interface 300 which corresponds to one or more embodiments of the present invention.
Figure 4:
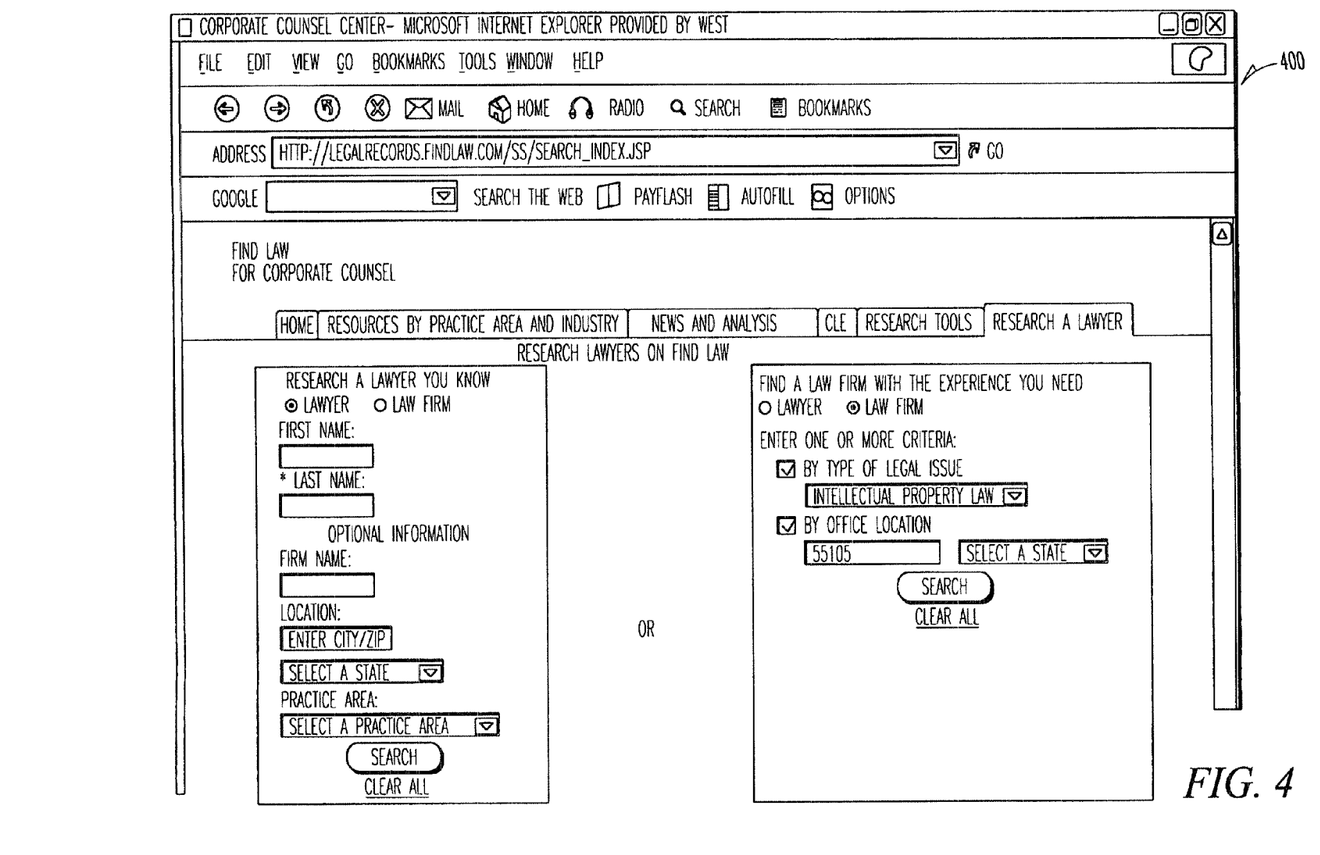
FIG. 4 is a facsimile of an exemplary graphical user interface 400 which corresponds to one or more embodiments of the present invention.
Figure 5:
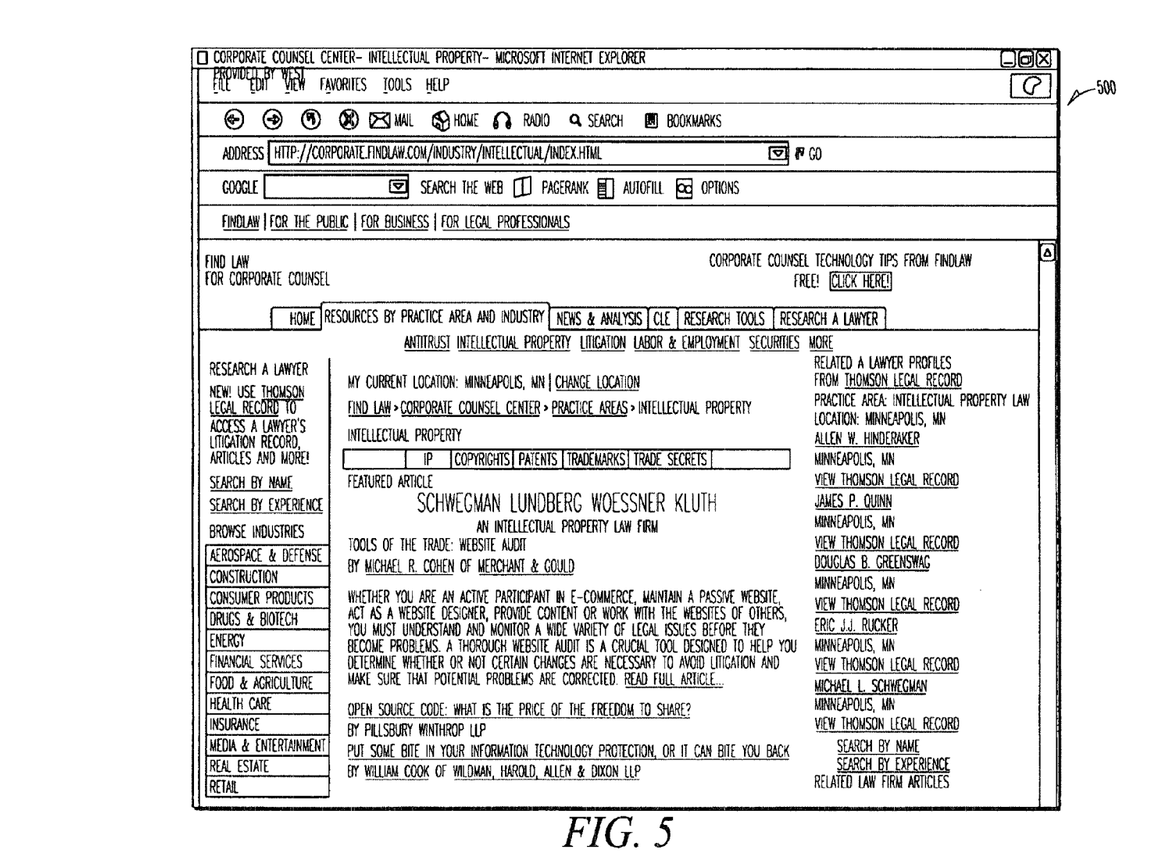
FIG. 5 is a facsimile of an exemplary graphical user interface 500 which corresponds to one or more embodiments of the present invention.

FIGS. 2-6 respectively show other exemplary interfaces 200, 300, 400, 500, and 600 that have one or more portions that may be used in place of one or more portions of GUI 138. In FIG. 2, interface 200 displays an attorney query for experts in a legal field of prior art who have tried cases under Margaret Kravchuk in Maine's First Circuit U.S. District Court. Interface 300 displays the resulting list of attorneys from the query according to their relevant litigation experience and authorship. In FIG. 4, interface 400 displays a query on intellectual-property law to be searched by law film. In FIG. 5, interface 500 displays a list of related attorney profiles within the context of a featured article. The attorney links listed on the right portion of the screen identify attorneys with legal expertise in the field that is featured in the article. The links, in some embodiments, are listed in rank order of experience, with the most experienced lawyer listed first.

Figure 6:
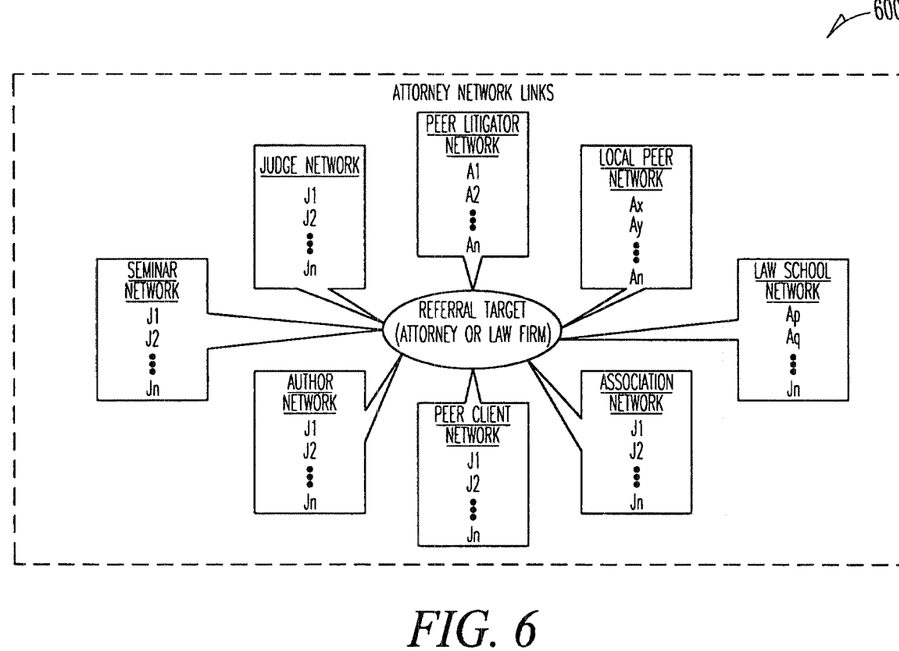
FIG. 6 is a facsimile of an exemplary graphical user interface 600 which also corresponds to one or more embodiments of the present invention.

In FIG. 6, interface 600 displays a visual relationship network for a given attorney, which in some embodiments may be a referral target or prospective lateral hire. The visual relationship network allows legal practitioners to facilitate referrals and to build an online "community" that provides associations with a variety of networks. Previous relationship-network applications only contain aggregate attorney attributes that form a limited universe of attorney information. Some embodiments use this figure as a template for a networking interface, in which a user selectively activates each cluster or family of nodes to initiate display of screens that show details, such as contact and profile information, including professional experience and third-party ratings, of people identified within the cluster. The judge network includes attorney appearances associated with judges, courts, legal matters, etc. The local peer network displays other attorneys who have appeared in front of the same judge, in the same courts, or on the same legal matters. Additional sub-networks provide information related to their titles.

Thus, various embodiments provide users the capability to search for expertise on specific legal matters, in specific courts, before specific judges. In addition, this feature allows firms to make hiring decisions by providing a view of an attorney's litigation record that is drawn from court decisions in a proprietary online legal research service. Profiles also display a full view of a legal practitioner's litigation experience to assist in these hiring decisions. This history can also be useful in assessing potential conflicts of interest for given attorneys.

Exemplary Methods of Operating an Information-Retrieval System

Figure 7:
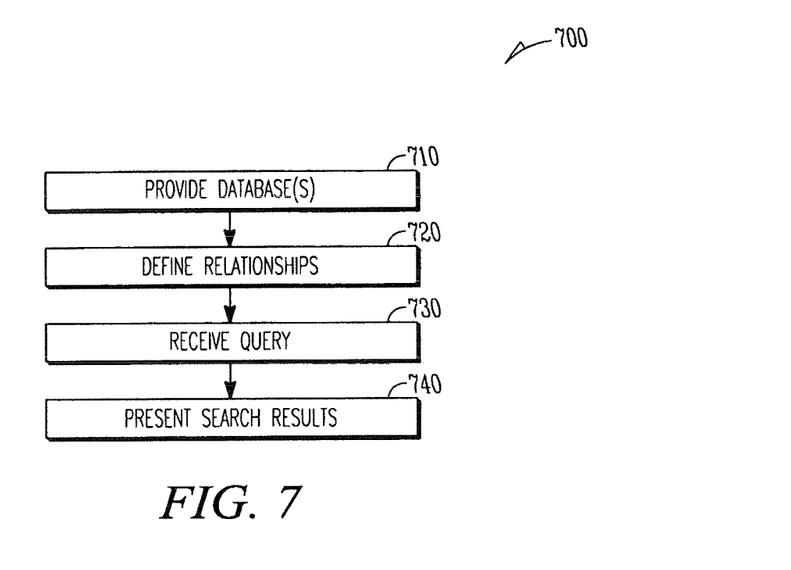
FIG. 7 is flow chart of an exemplary method corresponding to one or more embodiments of the present invention.

FIG. 7 shows a flow chart 700 of an exemplary method of operating an information retrieval system, such as system 100 in FIG. 1. Flow chart 700 includes blocks 710-740, which are arranged and described serially. However, other embodiments execute two or more blocks in parallel using multiple processors or processor-like devices or a single processor organized as two or more virtual machines or sub processors. Other embodiments also alter the process sequence or provide different functional partitions or blocks to achieve analogous results. Moreover, still other embodiments implement the blocks as two or more interconnected hardware modules with related control and data signals communicated between and through the modules. Thus, the exemplary process flow applies to software, hardware, and firmware implementations.

At block 710, the exemplary method begins with provision of a multilingual document collection—that is a collection comprising two or more documents written in two or more languages. In the exemplary embodiment, the document collection takes the form of one or more databases, such as database 110 in FIG. 1. Execution continues at block 720.

Block 720 entails defining or extracting relationships between documents in the databases. In the exemplary embodiment, this entails using data-extraction module 124 in system 100 to extract entity names from the documents and using various techniques to identify or infer relationships between the extracted names. After the one or more indices are defined, processing continues at block 730.

Block 730 entails receiving a query from a user. In the exemplary embodiment, this entails a user directing a browser in a client access device, such as device 130 in FIG. 1, to an internet-protocol (IP) address for an online information-retrieval system, such as system 100, and then logging onto the system using appropriate credentials. Successful login results in a web-based search interface, such as interface 138 in FIG. 1 (or one or more portions thereof) being output from server 120, stored in memory 132, and displayed by client access device 130. The user then defines the query by interacting with the interface, specifically entering data into one or more query fields or selecting from various drop-down menus. feature to transmit the query to a server, such as server 120 for processing. Execution then advances to block 740 (as shown in FIG. 7.)

Block 740 entails presenting a graphical user interface listing the identified set of documents in groups based on corresponding language and/or in rank order of relevance. In the exemplary embodiment, this entails displaying a listing of the identified set of items, such as attorneys or documents and attorneys on interface 138, 200, 300, 400, or 500. In some embodiments, selection of a link associated with a listed attorney causes retrieval of a profile for the attorney, with the profile including a link to cause display of an interface, such as interface 600, which shows various networks that the respective attorney belongs to. In some variations of these embodiments, an additional charge is levied against the subscriber upon accessing interface 600 and the value-added information it provides.

Figure 8:
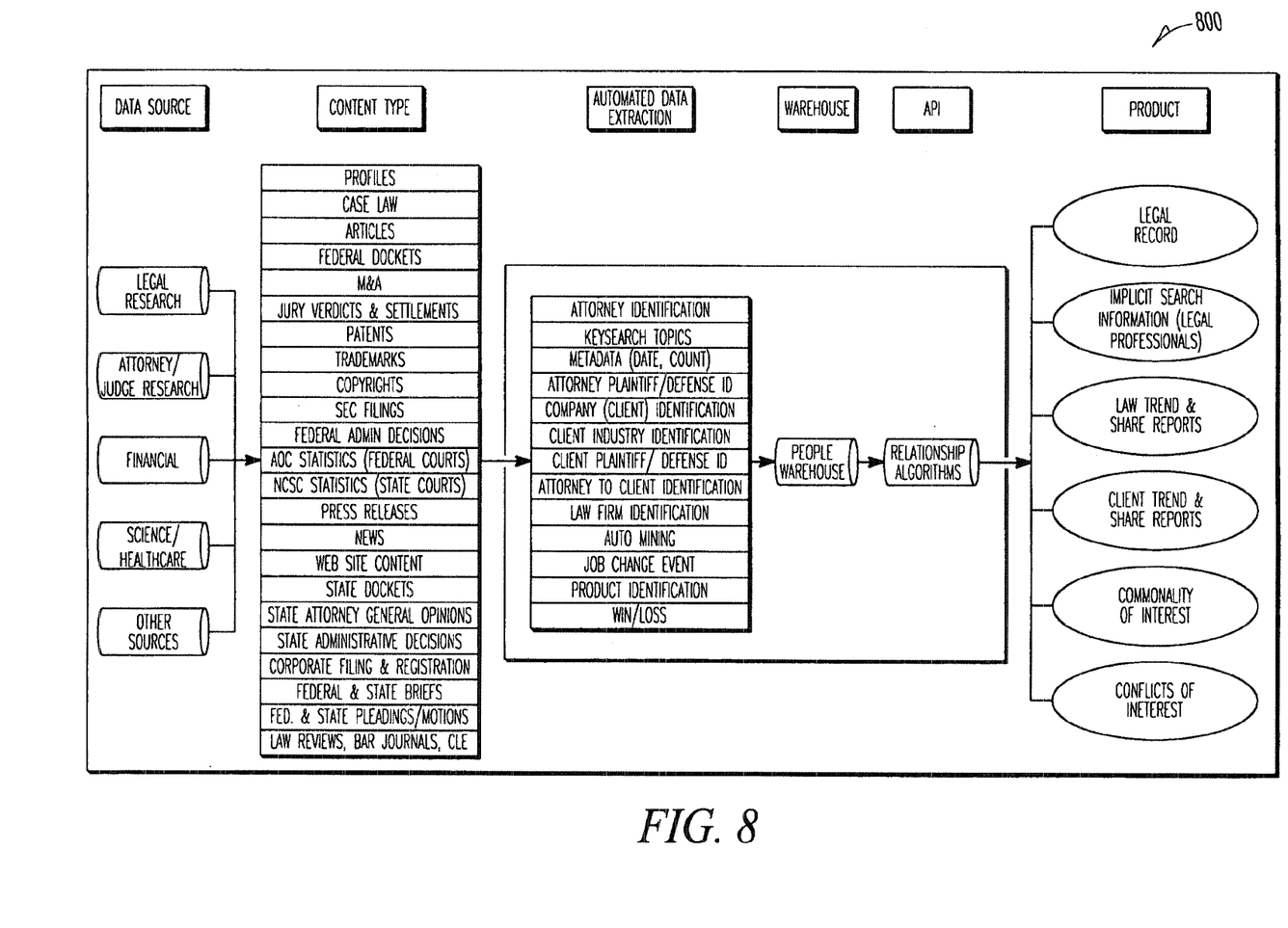
FIG. 8 is a block diagram of an exemplary method corresponding to one or more embodiments of the present invention.

FIG. 8 shows a high-level flow diagram that may be employed at block 720 or within data extraction module 124. The diagram includes workflow and supporting components. Data sources (in the first column) from various proprietary repositories contain a variety of content types. In this diagram, the content types include articles, law reviews, mergers and acquisitions (M&A), and political contributions. The data-extraction column displays the programs that extract data from the content according to the functions/products the data will support. For example, the law-trend and client-trend report applications require data to be extracted by identifying the company, attorney-to-client relationship, and law-firm. In addition, auto-mining and "job change event" extraction may be used. Auto-mining is essentially the process by which an attorney is added to the content repository if he or she is not identified by the extraction program. "Job change event" extraction monitors press releases for updates to an attorney's position within his or her existing firm or another firm. Once the data is extracted by the mining programs according to function, it is placed in a "relationship authority," or relational data structure, such as an index or added as meta data to attorney and corporate profiles. An inference engine (RMS++, not shown) then processes data from the relationship algorithm into final products. This engine is built with a series of algorithms (rules) that infer the relationships of attorneys, employment information, corporate legal data, etc. For example, if Attorney A has appeared before Judge A during the same case as Attorney B, the inference rules within the engine would determine that Attorneys A and B were involved in the same case.

CONCLUSION

The embodiments described above and in the claims are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A method for determining and displaying legal experience comprising:
    determining a count of times at least one attorney of a plurality of attorneys is identified as an author of at least one document of a plurality of documents, each document of the plurality of documents having a date, at least one business, and at least one practice area associated therewith;
    applying a weight to the count based on the date associated with each document used to determine the count to yield a weighted count, wherein a more recent date corresponds to a greater weight;
    determining an attorney legal experience indicator for each attorney in the at least one practice area based on the weighted count;
    ranking each attorney of the plurality of attorneys according to the attorney legal experience indicator;
    associating each attorney of the plurality of attorneys with one or more textual articles based on a context of the one or more textual articles;
    associating each attorney with the at least one business of a plurality of businesses;
    determining a business legal experience indicator for each business of the plurality of businesses according to the at least one practice area based on the attorney legal experience indicator for each attorney associated with each business;
    ranking each business of the plurality of businesses according to the at least one practice area based on the business legal experience indicator; and
    providing, in response to a query indicating a particular practice area, at least one of the one or more textual articles, at least a portion of a list of each attorney associated with the particular practice area indexed according the ranking of each attorney, and at least a portion of a list of each business associated with the particular practice area indexed according to the ranking of each business.

2. The method of claim 1, further comprising:
    receiving the query indicating the particular practice area;

determining a scope of the query to include at least one of a local jurisdiction, a state jurisdiction or a federal jurisdiction;

assigning each document to at least one of the local jurisdiction, the state jurisdiction, and the federal jurisdiction, wherein the determining the attorney legal experience indicator for each attorney in the at least one practice area further comprises determining the attorney legal experience indicator for each attorney according to at least one of the jurisdictions; and matching the attorney legal experience indicator to the query based on the at least one jurisdiction.

3. The method of claim 1, further comprising:

determining a success rate for each attorney of the plurality of attorneys, and wherein determining the attorney legal experience indicator for each attorney in the at least one practice area further comprises determining the attorney legal experience indicator in the at least one practice area based on the weighted count and the success rate.

4. The method of claim 1, wherein each document is one selected from the group consisting of: judicial opinions, court documents, briefs, litigation documents, journal articles, patent documents, and trademark documents.

5. The method of claim 1, further comprising:

determining a supplemental experiential rating of each attorney of the plurality of attorneys based on a user specified criterion, wherein the ranking of each attorney of the plurality of attorneys according to the attorney legal experience indicator further comprises ranking each attorney of the plurality of attorneys according to the supplemental experiential rating.

6. An apparatus for determining and causing display of legal experience, comprising:

a computer processor adapted to execute one or more processes; and a memory configured to store a process executable by the computer processor, the one or more processes when executed operable to:

determine a count of times at least one attorney of a plurality of attorneys is identified as an author of at least one document of a plurality of documents, each document of the plurality of documents having a date, at least one business, and at least one practice area associated therewith;

apply a weight to the count based on the date associated with each document used to determine the count to yield a weighted count, wherein a more recent date corresponds to a greater weight;

determine an attorney legal experience indicator for each attorney in the at least one practice area based on the weighted count;

rank each attorney of the plurality of attorneys according to the attorney legal experience indicator;

associate each attorney of the plurality of attorneys with one or more textual articles based on a context of the one or more textual articles;

associate each attorney with the at least one business of a plurality of businesses;

determine a business legal experience indicator for each business of the plurality of businesses according to the at least one practice area based on the attorney legal experience indicator for each attorney associated with each business;

rank each business of the plurality of businesses according to the at least one practice area based on the business legal experience indicator; and provide, in response to a query indicating a particular practice area, at least one of the one or more textual articles, at least a portion of a list of each attorney associated with the particular practice area indexed according the ranking of each attorney, and at least a portion of a list of each business associated with the particular practice area indexed according to the ranking of each business.

7. The apparatus of claim 6, wherein the process, when executed, is further operable to:

determine a supplemental experiential rating of each attorney of the plurality of attorneys in real-time based on a user specified criterion, and wherein, the process to rank each attorney of the plurality of attorneys according to the attorney legal experience indicator further comprises rank each attorney of the plurality of attorneys according to the supplemental experiential rating.

\* \* \* \* \*